Jan. 28, 1941.  D. A. MEEKER ET AL  2,229,663
WASHING MACHINE
Filed Oct. 24, 1936    8 Sheets-Sheet 1

INVENTOR
David A. Meeker
Herbert L. Johnston
BY
Maréchal & Noe
ATTORNEY

Jan. 28, 1941.  D. A. MEEKER ET AL  2,229,663
WASHING MACHINE
Filed Oct. 24, 1936    8 Sheets-Sheet 2

INVENTOR
David A. Meeker
Herbert L. Johnston
BY
Maréchal & Noe
ATTORNEY

Fig. 11

Jan. 28, 1941.  D. A. MEEKER ET AL  2,229,663
WASHING MACHINE
Filed Oct. 24, 1936  8 Sheets-Sheet 6

INVENTOR
David A. Meeker
Herbert L. Johnston
BY
Maréchal & Noë
ATTORNEY

Jan. 28, 1941.  D. A. MEEKER ET AL  2,229,663
WASHING MACHINE
Filed Oct. 24, 1936  8 Sheets-Sheet 7

INVENTOR
David A. Meeker
Herbert L. Johnston
BY
Maréchal & Noe
ATTORNEY

Patented Jan. 28, 1941

2,229,663

UNITED STATES PATENT OFFICE 2,229,663

WASHING MACHINE

David A. Meeker and Herbert L. Johnston, Troy, Ohio, assignors to The Hobart Manufacturing Company, Troy, Ohio, a corporation of Ohio Application October 24, 1936, Serial No. 107,477

14 Claims. (Cl. 141—9)

This invention relates to machines for washing dishes and the like.

One object of the invention is the provision of a machine for washing dishes and the like, having a conveying means for moving dishes through the washing chamber of such character as to give direct periodic feeding or propelling movements to the dishes without destructive jars or shocks.

Another object of the invention is the provision of a washing machine of the character mentioned, having a conveying means which carries the dishes through the washing zone, the conveying means having portions which are movable successively into lifting and propelling engagement with the dishes.

Another object of the invention is the provision of a washing machine having elongated dish supporting and feeding bars which are alternately movable into engagement with the dishes to propel the dishes through the machine and which are so constructed and so related to the spray jets as to expose all portions of the dishes to the sprays of washing fluid in the washing chamber.

Another object of the invention is the provision of a dish conveying mechanism for dishwashing machines or the like arranged to move the dishes continuously through the washing chamber and to move the dishes at a slower rate of travel after the washing operation has been completed.

Other objects and advantages of the invention will be apparent from the following specification, the appended claims and the accompanying drawings, in which—

In accordance with the present invention, the washing machine, which is adapted for washing dishes and the like, comprises a washing compartment in which washing liquid is sprayed on the dishes, a rinsing compartment where the dishes are treated to a rinsing spray or sprays, and a propelling or conveying mechanism which carries the dishes through the machine from the entrance point to the point of discharge. Referring more particularly to the drawings by reference numerals, the machine illustrated in Figs. 1 to 21 inclusive comprises a frame structure 10 providing a washing compartment 11 and a rinsing compartment 12. The dishes are supplied past a flexible curtain through an opening 13 at the right-hand end of the cover 14 of the washing compartment and are moved through the machine on a conveyor which is designated generally by the reference numeral 15. As the dishes pass through the washing compartment they are subjected to sprays of washing liquid, such as water and suitable cleansing material, the washing compartment being provided with a plurality of vertically directed sprays projecting the liquid downwardly from above the dishes and upwardly from below the dishes from the distributing spray pipes 16 and 17 respectively.

The spray pipes 16 and 17 are connected to a supply pipe 18 through which the cleaning liquid is forced by means of a suitable pump 19 operated by an electric motor 20 or other suitable source of power. As will be apparent from Figs. 1 and 2, the motor and the pump, as well as the pump 23 which is provided for the rinse liquid, are all arranged in a compartment 24 provided below the lower wall 25 of the washing chamber and below the corresponding wall of the rinsing chamber, and normally enclosed by a plurality of removable front closure panels 26. Valve controlling handles 21 are provided at the front of the machine to control the filling of the tanks from a source of water supply.

The washing liquid that is sprayed on the dishes in the washing chamber is returned to the reservoir tank 30 provided below the washing chamber, the tank being in communication with the inlet side of the pump 19 through a pipe 31 so that the washing liquid can be circulated from the tank, through the pump and through the pipe 18 to the distributing spray nozzles. The level of the washing liquid is prevented from rising above a predetermined level in the reservoir tank by means of an overflow pipe 32 which is open at its upper end at the desired liquid level and which connects to a discharge pipe 33. A lever 28 at the front of the machine can be operated manually to drain the tank through the same pipe 33, a similar drain being provided for the rinse compartment.

The water or other liquid which returns to the tank 30 from the dishes passes through a screen 35 arranged at the front of the washing compartment. The rear side of the screen from rests on a channel support 36 provided below the sheet metal partition wall 37 which drains the water from the rear part of the washing chamber down towards the screen 35. The front portion of the screen frame has a wall 38 inclining upwardly and forwardly and resting on an inclined wall 40 of the washing machine frame. The screen surface inclines downwardly and forwardly so that any material collected on the screen is washed towards the front of the machine where it can be readily pulled out as by means of a hoe or scraper 41 in the manner indicated in Fig. 3. It is a simple matter for the operator to scrape out any garbage or trash, pulling it over the top of the inclined wall 40 so that it can be disposed of. Access is provided to the screen 35 by opening the hinged cover or door 43. The screen itself may be readily removed for cleaning purposes after opening the cover 43 by merely reaching into the space below the spray pipe 17, and withdrawing the screen forwardly and upwardly.

After the dishes are washed any washing fluid which remains on the dishes is removed in the rinsing chamber 12. The rinsing chamber, which is separated from the washing compartment by a partition wall 45, is rather similar to the washing compartment, being provided with upper and lower spray pipes 46 and 47 respectively, connected to a rinse water supply pipe 48 which extends upwardly from the rinse water pump 23. The pump 23 has a rotor or pumping member which is fixed to the rotor of the pump 19 and both pumps are operated by a common driving motor, although the casings of the two pumps provide independent pump passages. The pump casing of the rinse water pump 23 is connected to the supply pipe 50 which extends from the bottom of the rinse water tank 51. A drain 52 open at its upper end is provided to maintain a constant level of liquid in the rinse water tank, being connected to the discharge pipe 33.

As will now be apparent the dishes may be supplied through the opening in the right hand end of the machine, and carried by the conveyor past a pair of flexible curtains 54 and into the washing compartment where they are subjected to the washing sprays. Then they pass by the flexible curtains 55 which separate the wash and the rinse sprays, and the dishes are then rinsed in the second chamber 12. They are then carried past the flexible curtain 56 and into the final spray chamber 58 where they are subjected to top and bottom hot water sprays issuing from spray pipes 59 which are connected to a supply pipe 60 controlled by valve 61 and extending to the hot water supply pipe 62. After receiving the final rinse spray in this compartment, the dishes are carried by the conveyor through the end curtain 56 and are disposed on a receiving table from which they can be readily removed. Access to the washing and rinsing chambers is readily effected through the vertically movable slide doors 62.

The conveying or propelling mechanism which carries the dishes through the machine is one which, as a whole, provides a substantially continuous movement of the dishes. It is so constructed that all parts of the dishes are subjected to the washing and rinsing sprays. The conveying mechanism comprises a number of elongated dish carrying members which extend parallel to one another in the direction of movement of the dishes. As will be more apparent from Figs. 8 to 11 inclusive, the dish carrying members are arranged in sets so as to constitute a plurality of conveying frames 64 and 65 each of which preferably extends the full length and width of the machine. These frames are each adapted for periodical propelling engagement with the dishes. Each frame includes a number of parallel dish carrying members or bars spaced apart laterally and alternating with the dish carrying members or bars of the other frame.

Figures 8, 12, 21:
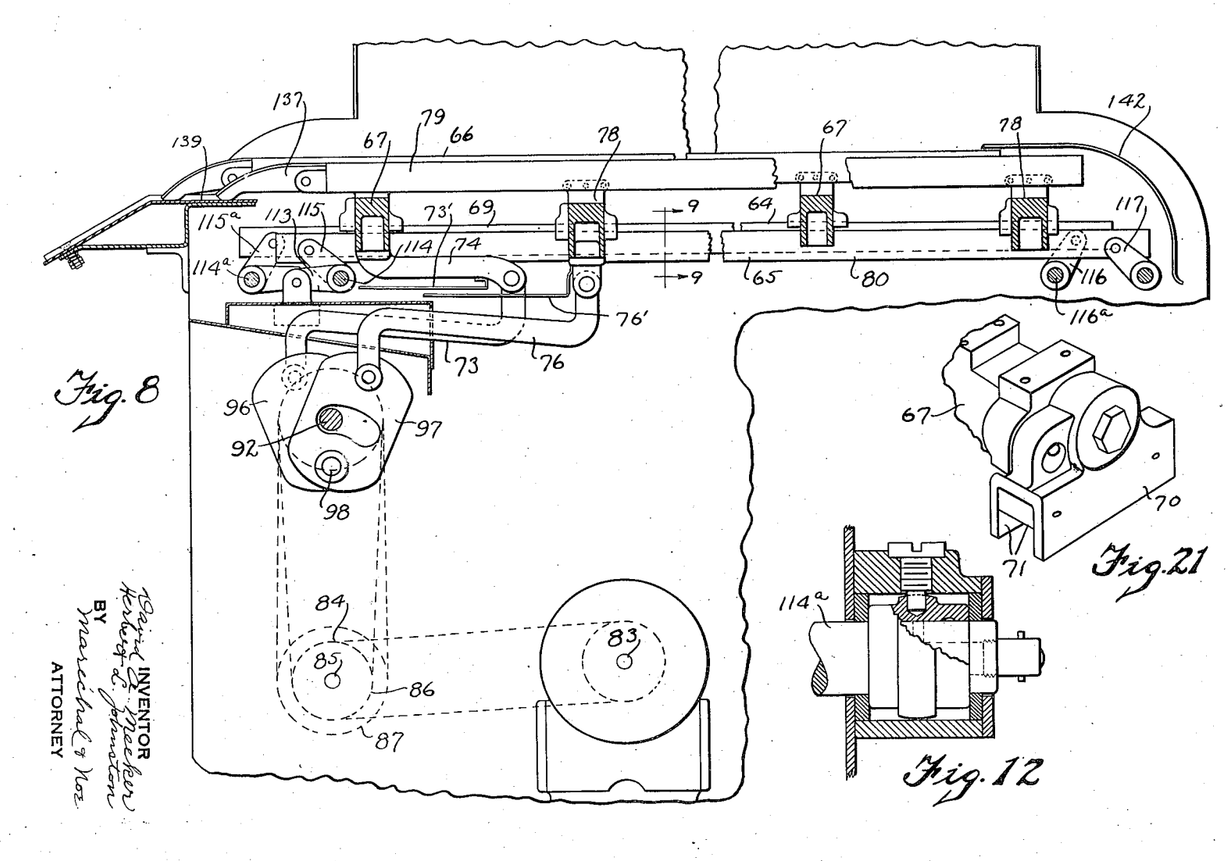
Fig. 8 is a section taken longitudinally of the machine at one side of the conveying mechanism and illustrating the connection between the rails and the oscillatory drive links which move the rails longitudinally.
Fig. 12 is a detailed sectional view on the line 12—12 of Fig. 1.
Fig. 21 is a perspective view illustrating one of the slide members at one end of a transversely extending beam of the conveyor.
Figure 11:
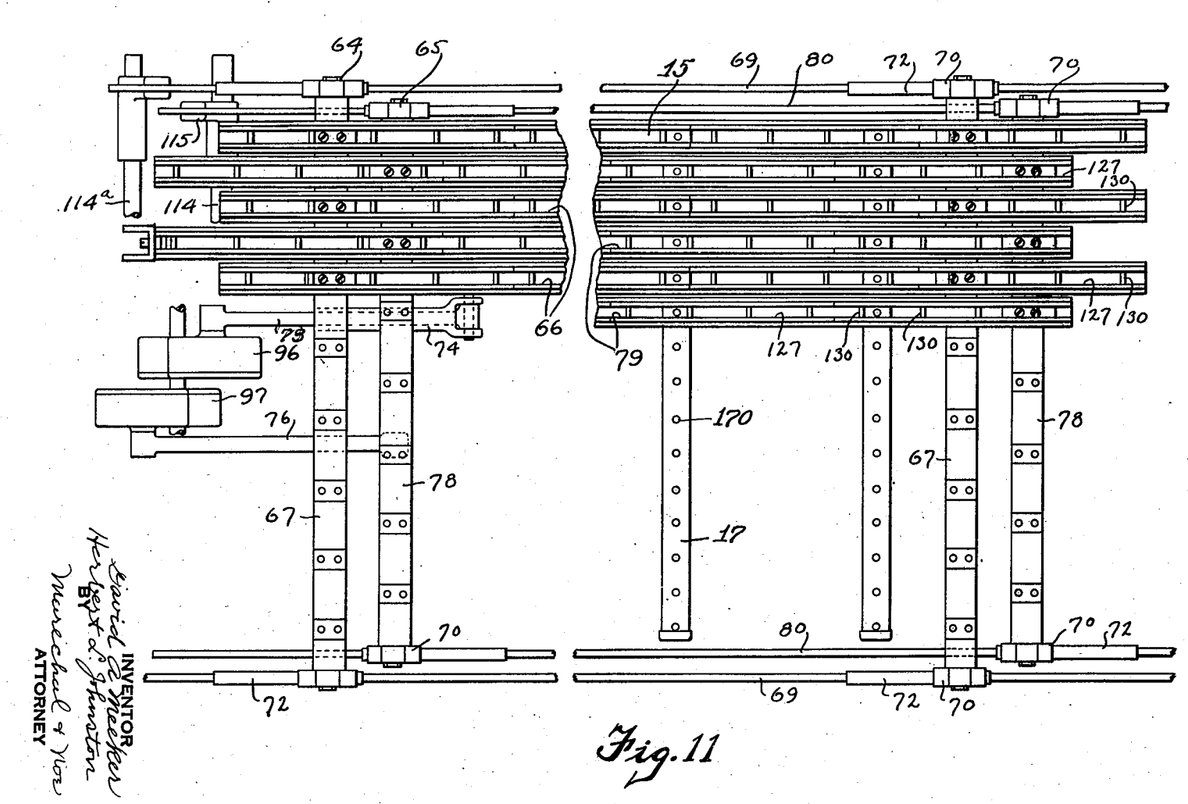
Fig. 11 is a top plan view of portions of the conveyor drive.
Figure 13:
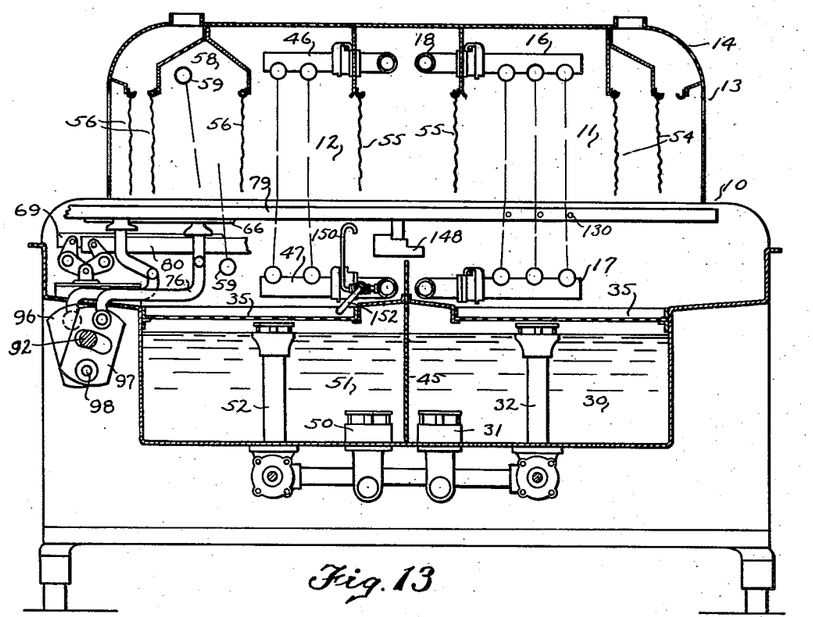
Fig. 13 is a vertical sectional view taken longitudinally through the machine on the line 13—13 of Fig. 2.

The dish carrying members 66, of the frame 64 are all screwed or otherwise secured to several transversely extending beams 67. Those beams are slidably supported, at their ends, on two longitudinally extending rails 69 which are moved up and down as will be more fully described to provide up and down movements of the dish carrying members 66. The ends of a transverse beam 67, as shown in Figs. 21 and 11, are supported in shoes 70 each provided with guide surfaces 71 slidable along an enlarged guide portion 72 fixed on each of the bars 69. The ends of the beams are rounded and seat in cylindrical seats in the shoes so that some rocking pivotal movement of a beam may take place, although the beam is adequately supported so the beam and its supporting shoes move at the same time in the direction of feeding movement.

The transversely extending beams 67 are operated horizontally in an oscillatory manner by means of a driving arm 73 which is connected to a forwardly extending arm 74 fixed to the forward beam 67. The driving arm 73 is operated to impart a horizontally oscillatory movement to the frame 64 in timed relation with the oscillatory movement imparted by the driving arm 76 which operates the second frame 65 so that while one frame is moving forwardly the other moves rearwardly. The frame 65 comprises the several beams 78 which are secured to the series of longitudinally extending dish carrying members or bars 79, the latter being arranged between adjacent carrying members 66 of the other frame 64. The ends of the beams 78 are carried by shoes 70 on the two longitudinally extending rails 80 which are parallel to the rails 69 and extend throughout the length of the machine.

Figure 1:
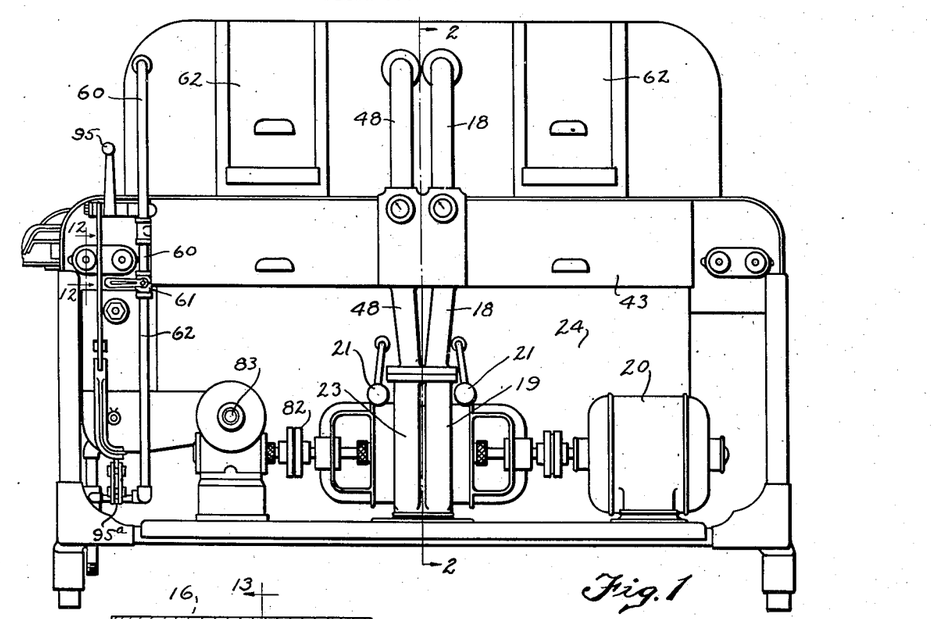
Fig. 1 is a front elevation of a dish washing machine embodying the present invention, some of the front cover panels being removed.
Figures 2, 3:
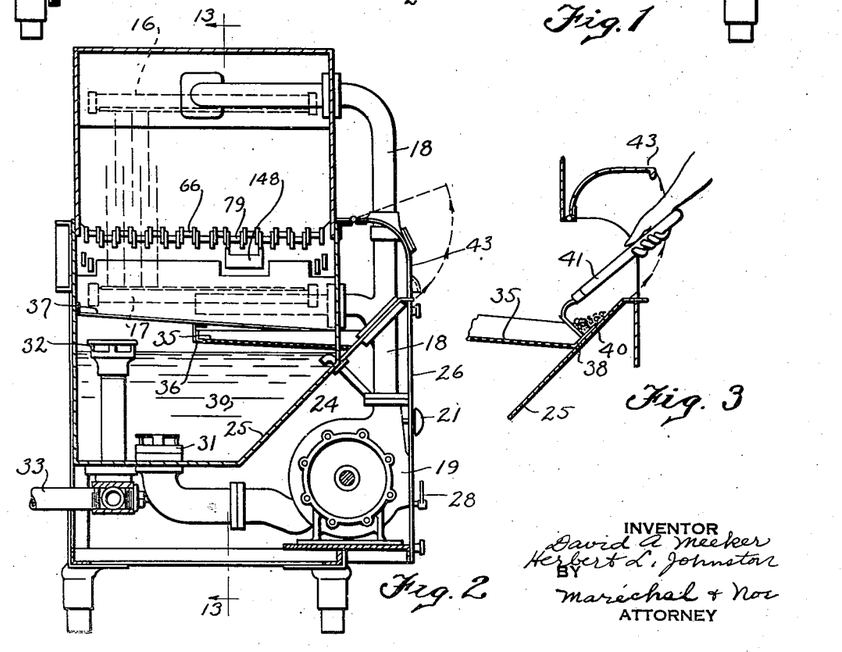
Fig. 2 is a vertical section taken through the machine on the line 2—2 of Fig. 1.
Fig. 3 is a vertical section through the front of the machine illustrating the removal of matter collected on the screen of the washing compartment.
Figures 4, 5, 6, 7:
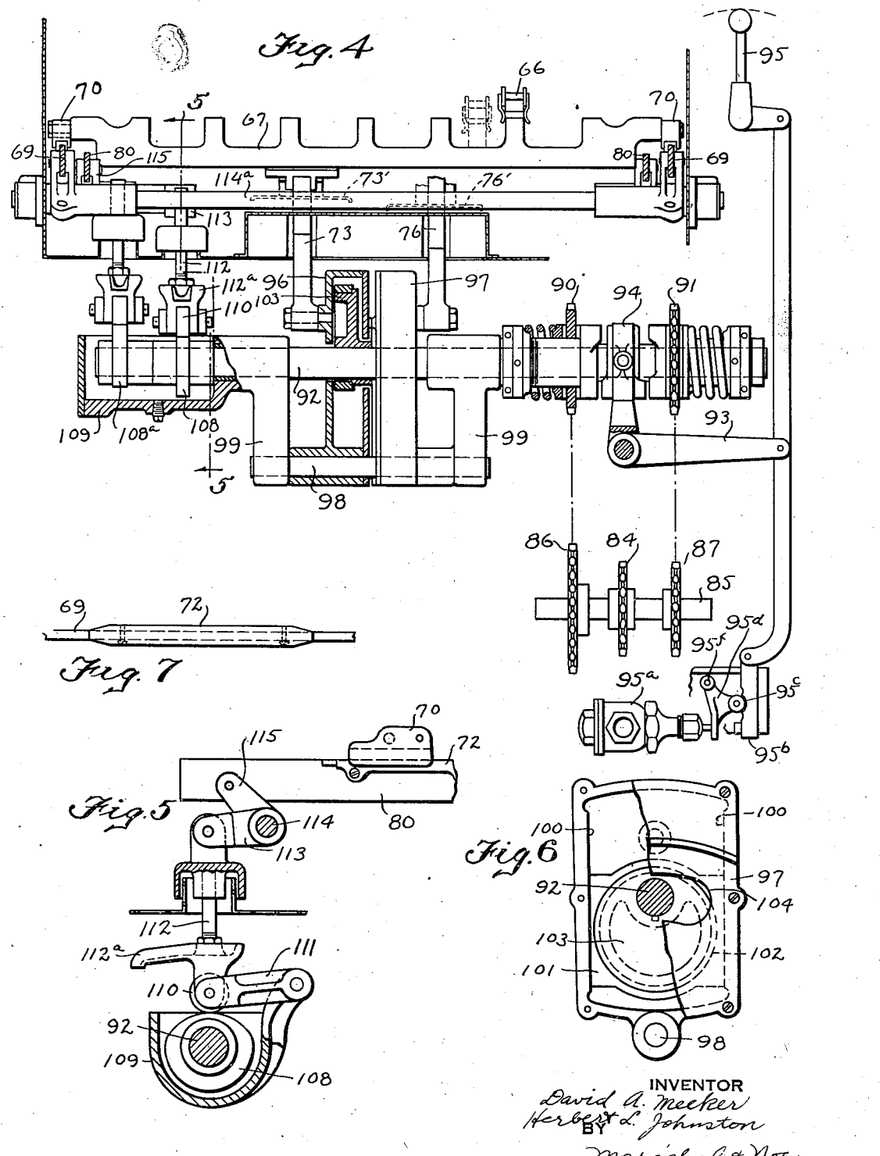
Fig. 4 is a vertical elevational view, partly in section, illustrating the driving mechanism of the dish conveyor.
Fig. 5 is a vertical sectional view on the line 5—5 of Fig. 4, showing how the conveyor bars are raised and lowered.
Fig. 6 is a vertical partially broken view through one of the drive members.
Fig. 7 is a top plan view of a portion of one of the bar supporting rails.

The means for oscillating frames 64 and 65 in opposite directions is shown in Figs. 4 to 8, and is preferably driven by the same motor 20 which operates the pumps 19 and 23. The rotor shaft of the pump 23 is connected through a suitable coupling 82 to a driven shaft 83, a worm and worm gear drive or the like between the coupling 82 and shaft 83 serving to operate the latter at a comparatively slow speed. The shaft 83 is connected by a drive chain or other suitable transmission to a sprocket gear 84 fixed on shaft 85, the latter being provided with large and small sprocket gears 86 and 87 respectively connected to driven sprocket wheels 90 and 91. The latter are provided loosely on a shaft 92 and are adapted to be selectively clutched to the shaft 92 so as to operate the latter at high speed or low speed as desired, under the control of the clutch shifting lever 93 which axially shifts the collar 94 and is operatively connected to a handle 95 (Fig. 4). The collar is keyed to the shaft 92 for engagement with either of the driven clutch members. At the same time the conveyor is clutched to the driving motor there is an operation of a whistle valve 95a which is provided in the hot water rinse pipe 62 ahead of the rinse control valve which is operated by the handle 61. The valve 95a is closed when its spring pressed plunger is in its outer position, as indicated in Fig. 4. From this position it is moved to open position when the handle 95 is moved in either direction for engagement with the clutch of the conveyor. When the handle 95 is moved either to the right or left from its neutral position indicated in Fig. 4, it moves a slide block 95b endwise and forces the lever 95d to the left as the latter rides out of the deep notch 95c. The lever is pivoted at its upper end on a stud 95f. The flow of hot rinse water is thus shut off if the conveyor is not operating, but as long as the conveyor is moving there is a constant flow of rinse water through the pipe 62, the amount of flow being governed by the valve which is controlled by the lever 61.

The shaft 92 is arranged to oscillate two drive members 96 and 97 in opposite directions, these members being pivotally supported at their lower ends on a fixed shaft 98 carried in brackets 99 mounted on the machine frame. The drive member 97 provides guide surfaces 100 slidably guiding slide block 101. The latter is provided with a cylindrical passage receiving a rotatable eccentric member 102 which is fixed on the shaft 92. Thus as the eccentric 102 moves about the axis of the shaft 92 the slide block 101 will be moved laterally and will be raised and lowered in the guide surfaces, so that the drive member 97 will be oscillated about its shaft 98. The side walls 103 of the drive member 97 are provided with slotted passages 104 through which the shaft 92 extends. The drive member 96 is similarly arranged and similarly operated from the shaft 92, but the two eccentrics for the two drive members are displaced 180° apart on the shaft 92 so that when one member moves forwardly the other moves rearwardly and vice versa. Fig. 8 shows the two drive members almost in their extreme positions and about ready to move towards one another, while Fig. 11 shows the transversely extending beams 67 and 78 of the two frames in their closest positions. Even in this position the beams 67 and 78 are spaced apart a substantial distance and far enough so that injury to the hands of the operator who accidently may place his fingers between them will be avoided.

Figure 10:
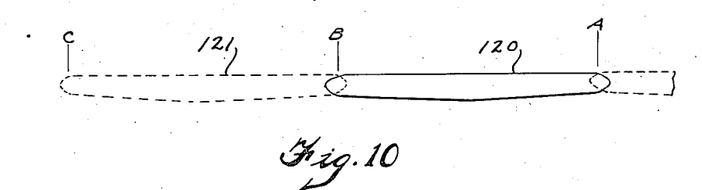
Fig. 10 is a diagrammatic representation of the paths of movement of points on adjacent bars of the conveyor.

As the frames are moved back and forth in a longitudinal direction, they are also raised and lowered so that any conveyor bar is moved bodily in the same path or orbit, as indicated in Fig. 10. One frame member moves forwardly in the direction of feeding movement and then near the end of its forward movement it is lowered and returns rearwardly while lowered. It is then raised near the end of its return movement and the movements are repeated.

Figure 9:
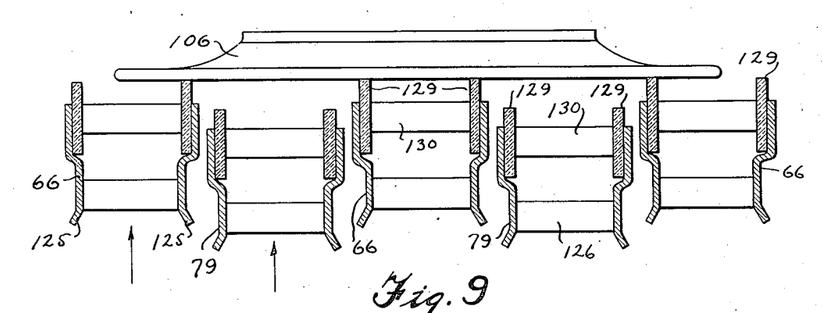
Fig. 9 is a vertical section on the line 9—9 of Fig. 8 illustrating a plate supported by some of the conveyor bars.

An adjacent dish carrying member, being a part of the other frame, moves upwardly as the first frame moves downwardly, so that the articles which are carried by the conveyor are successively engaged, carried and propelled by the different frames, and by alternate dish carrying members. The dishes are thus given a continuous movement through the machine, being propelled first by one dish carrying frame and then by the other. Fig. 9 shows a dish 106 supported by the carrying members 66 of the frame 64, the carrying members 79 of the other frame returning oppositely to the direction of forward feeding movement so that they in turn can move upwardly and support and propel the dish at the end of the feeding movements of the carrying members 66.

The mechanism for raising and lowering the frames is preferably independent of the mechanism that produces their horizontal reciprocatory movement, although the two mechanisms are driven by a common motor so as to be operated in proper timed relation. The shaft 92, as shown in Fig. 4, carries a cam 108 which preferably operates in a lubricant receptacle 109. Engageable with the cam 108 is a roller 110 carried in cooperative relation with the cam by means of a pivoted link 111. The roller 110 causes vertical reciprocatory movement of a push rod 112 which is provided as shown in Figs. 4 and 5 with suitable shield plates 112a preventing the rinse water from falling into the lubricant receptacle. The upper end of the push rod 112 is pivotally connected to an arm 113 which is fixed on a transversely extending shaft 114 which is journalled at its ends in the manner illustrated in Fig. 12. Arms 115 are provided on the shaft 114 closely adjacent the sides of the machine and are pivotally connected to the supporting rails 80 of the frame 65, so that both rails 80 are simultaneously raised and lowered. As will be apparent from Fig. 5, the cam 108 is of such form that the entire lift of the roller 110 will take place within about 90° rotation of the shaft 92, and the timing of the cam 108 with respect to the eccentric in the oscillatory drive member 97, both of which control the movements of the frame 65, is such that the latter is raised and lowered at the ends of the reciprocatory strokes.

A similar cam 108a is provided on the shaft 92 and similarly controls a rock shaft 114a which is provided with arms 115a pivotally connected to the ends of the rails 69. The cams 108 and 108a are displaced relatively 180° so that as either frame is raised the other is lowered. Only one end of each pair of rails 69 is positively driven. The opposite ends of the rails 69 are supported by arms 116 supported on a shaft 116a so that as the rails are moved in the direction of their length they are also moved up and down equal amounts at opposite ends. In the same manner, pivoted arms 117 are pivotally connected to the ends of the rails 80 so that both ends of the rails 80 are simultaneously raised and lowered equal amounts.

Again referring to Fig. 6, it will be noted that as the shaft 92 rotates at a constant speed, any angular movement of the shaft will impart a greater degree of movement to the oscillatory drive member 97 when the eccentric extends downwardly (as in the position shown in Fig. 6) than when the eccentric extends upwardly from the shaft 92. When the eccentric is above, a smaller degree of movement will be given for the same angular rotation of the shaft 92. The construction is such that there is a rapid return stroke of the dish carrying members, and a slower forward feeding stroke so that during about 180° of rotation of the shaft 92 the dish carrying members may complete practically all of their lowering movement, all of their return movement, and practically all of their lifting movement. With such a construction, the lifting members of one frame can be brought into engagement with the dishes and take them from the other frame while both frames are traveling in a forward direction, and the dishes need never stop their forward movement although at the time of transfer from one frame to the other the speed of movement may be considerably reduced. However, with the dish carrying members that are assuming the load traveling in the direction of forward feed and picking up the load before the load stops moving, it will be apparent that the dishes can travel continuously and without any waste of time or capacity of the machine, and can be transferred from one carrying member to another without destructive shocks or jars. The paths of movement of different points in two adjacent dish carrying members may be represented by the solid lines and dotted lines in Fig. 10, the line 120 between the points A and B indicating the forward feeding movement which takes place in the bars 66 for 180° rotation of the shaft 92 and the dotted line 121 between the points B and C indicating the forward feeding movement of the dish carrying members 79 in the next 180° rotation of the shaft 92. The curved ends of the orbital paths indicate the extent and timing of the raising and lowering movements of the rails 69 and 80.

Figures 18, 19, 20:
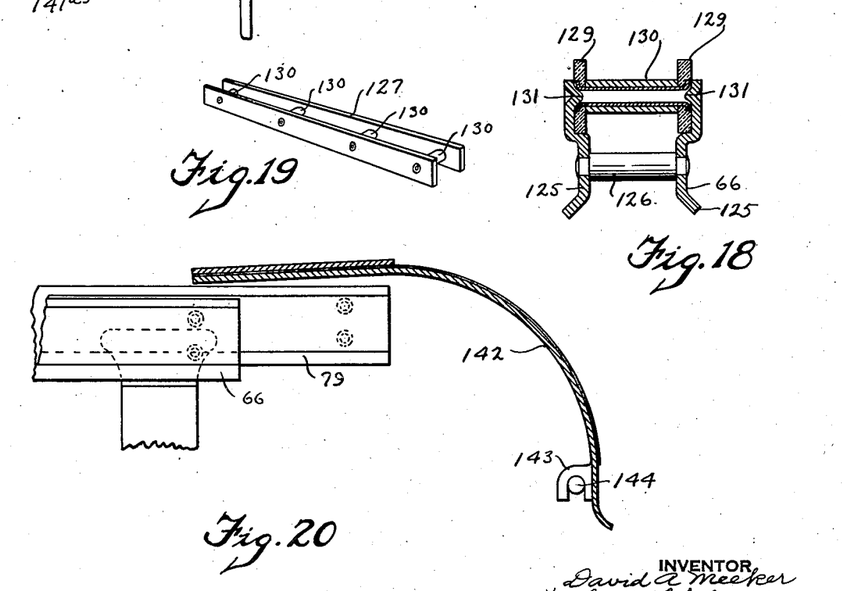
Fig. 18 is a vertical section through one of the dish carrying bars, taken on the line 18—18 of Fig. 17.
Fig. 19 is a detail perspective view of a dish engaging member.
Fig. 20 is a detail view illustrating the supply end of the conveyor as viewed from one side thereof.

Each of the longitudinally extending bars or carrying members 66 of the conveyor preferably comprises a pair of laterally spaced side portions or plates 125, quite narrow in horizontal width, and extending from one transverse bar 67 to another. Metal spacing studs 126 maintain the plates 125 in horizontally spaced relation. The upper portions of the plates are bent outwardly, as indicated in Fig. 18, and provide a grooved seat in which a number of dish supporting members 127 are detachably held. These members 127 are arranged end to end between the opposed plates or side portions 125 of each bar and are adapted to be reversibly and interchangeably supported so that any dish supporting member may be inverted or may be turned end to end and held in any of these positions. Each dish support preferably comprises spaced strips 129 of Bakelite or other suitable non-metallic construction, held together by spacing spools 130. These spools are hollow and are adapted to receive projecting knobs or points 131 which extend inwardly from the metal plates 125, the latter having sufficient resiliency to permit the insertion and removal of the dish carrying members merely by springing the plates 125 apart. As the dish carrying members are of symmetrical construction and as there is symmetrical spacing between the projections 131 along the length of any supporting bar it will be apparent that when wear occurs on the top of any dish supporting member, that member may be removed and replaced by another taken from a point where the wear is not as great, or it may be merely inverted end for end or turned upside down and replaced in the same bar.

The dishes are moved along by the conveyor in such a way as to expose every part of the dish to the action of the cleaning and rinsing sprays. The point of contact between a dish and the conveyor constantly changes. First one portion of the dish is supported by one of the carrying bars, and a moment later the supported portion of the dish is entirely freed from contact with any part of the conveyor and is subjected to the spray. Furthermore, as indicated in Fig. 11, the spray openings 170 are spaced apart along the length of the spray pipes 17 a distance corresponding to the distance between adjacent dish carrying bars, the spray openings being positioned centrally below the passages existing between adjacent side portions of any bar. The spaced studs that are provided between the side plate portions 125 of the conveyor bars are positioned so that they never move into a position above any of the sprays. And the small transversely extending spacing members or spools 130 that extend between the opposed strips 129 of the dish carrying members are positioned, as shown in Fig. 11, so that they never move into a position above a spray, the spacing between adjacent spools 130 being somewhat larger than the total length of the stroke of a conveying bar. It will thus be apparent that the upwardly directed sprays issuing from the various spray openings can operate effectively on the dishes so as to clean all parts of the downwardly facing parts while the downwardly directed streams of washing or rinsing liquid cover all parts of the upwardly facing parts of the dishes.

Figures 16, 17:
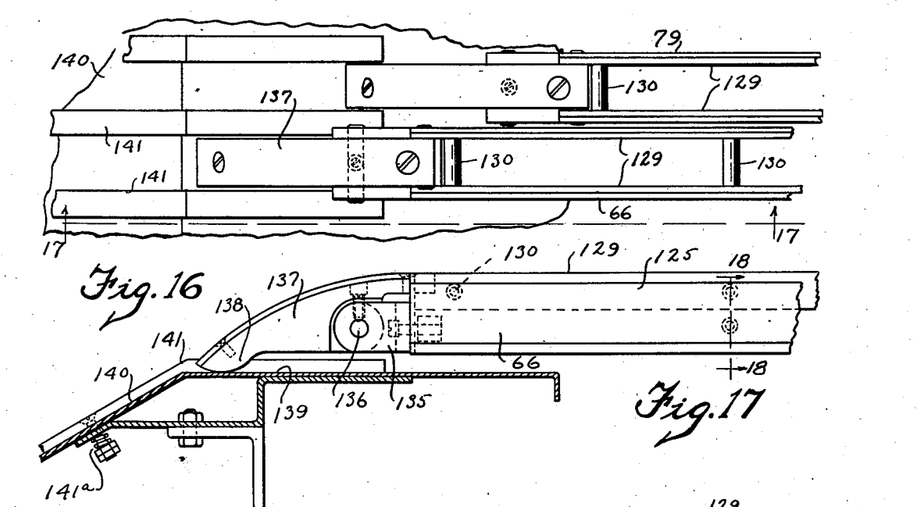
Fig. 16 is a top plan view of an end portion of the conveyor.
Fig. 17 is a vertical sectional view through an end portion of the conveyor as indicated by the section line 17—17 of Fig. 16.

Figs. 16, 17 and 8 show a preferred form of construction for the discharge ends of the bars 66 and 79 of the conveyor. The bar 66 for example, at its forward end, is provided with a projecting end portion 135 pivotally connected at 136 to a tapered shoe 137 having a portion 138 which rides on the flat sheet metal surface 139. The pivoted end of the shoe rises and falls with the bar 66. The dishes are conveyed to the ends of the bars 66 and 79 and are then pushed along by the pivoted shoes 137. The cleaned dishes are thus supplied to the inclined guideway 140 from which they may be picked up, or which may extend to a receiving table or the like. Strips of Bakelite or the like 141 are fixed to the metal sheet 139 so as to provide cushion members for the dishes. The strips of Bakelite are held in place by screws which extend through them and through the metal sheet, the screws having springs 141a interposed in front of the fastening nuts to keep a tight connection in spite of expansion and contraction effects.

At the ends of the bars to which the dishes are applied, the bars are covered by a curved plate 142 as shown in Fig. 20. One end of this plate is provided with a lug 143 which rests on a bar 144 fixed in the machine frame, so that the cover plate 142 can be readily removed. In its normal position it covers the supply ends of the different bars and permits the dishes to be conveniently applied to the moving bars of the conveyor.

Figure 14:
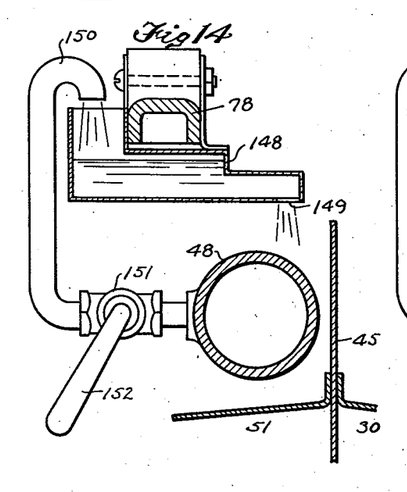
Fig. 14 is an enlarged detail showing the water replenishing device with the water transfer tank in its extreme advanced position.
Figure 15:
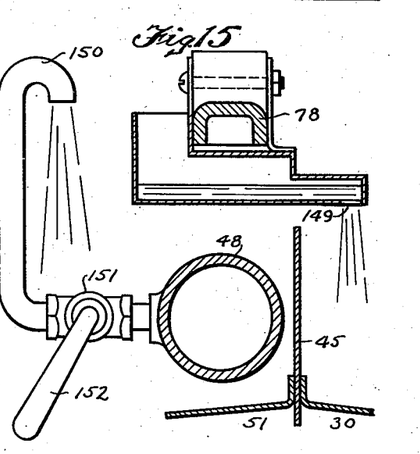
Fig. 15 is a corresponding view showing the tank moved rearwardly and partly into the washing compartment.

As some of the washing liquid is continuously carried by the dishes from the washing chamber to the rinsing chamber, it is preferred to replenish the supply of washing liquid periodically as the washing action progresses, and in an automatic manner. Some of the rinsing liquid is therefore supplied from the rinsing tank 51 and carried over into the washing chamber, the supply of liquid to the washing chamber being at a controlled rate and dependent upon the rate of feed of the conveyor. As a preferred form of construction, the invention includes a movable tank or bucket 148 having a restricted outlet 149 at the bottom of the bucket. The bucket 148 is carried by one of the conveyor frames, being fixed to one of the cross beams or one of the reciprocating bars for example so that in the most advanced position of the carrying frame the bucket is arranged as shown in Fig. 14 entirely within the rinsing chamber. In this position it receives rinse water from a pipe 150 which is connected through a valve 151 to the pipe 48 which supplies the water from the pump 23 to the rinse nozzles. The valve 151 may be suitably controlled by a lever 152 so that a small stream of rinse water continuously passes through the pipe 150. The flow through the pipe 150 is regulated so that it is larger than the flow rate through the comparatively small discharge passage in the bottom of the bucket 148. Thus there is an accumulation of water in the bucket when the latter is in the rinse compartment, and this water will be carried over and discharged into the washing compartment when the bucket is moved through a clearance passage in the top of the partition 45 to the position indicated in Fig. 15 by movement of the carrying frame towards the right. The flow of water through the pipe 150 when the bucket is not in a receiving position merely returns the rinse water to the rinse tank.

Figure 22:
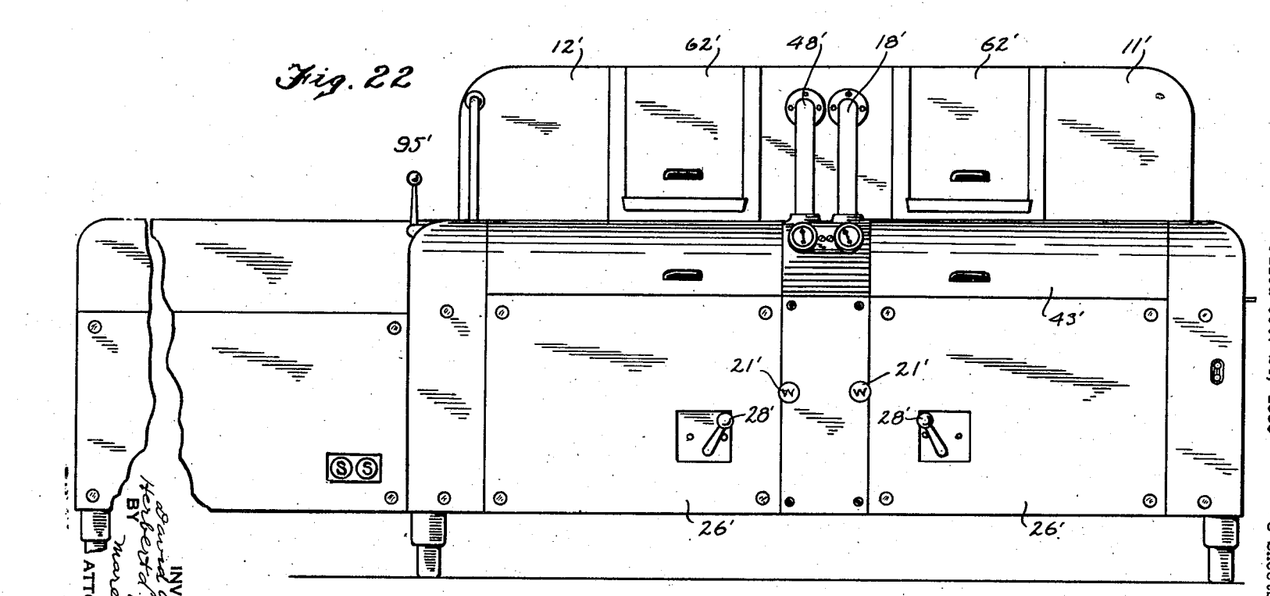
Fig. 22 is a side elevation of a modified form of dishwashing machine in which there is an extended table portion at the discharge end.
Figure 23:
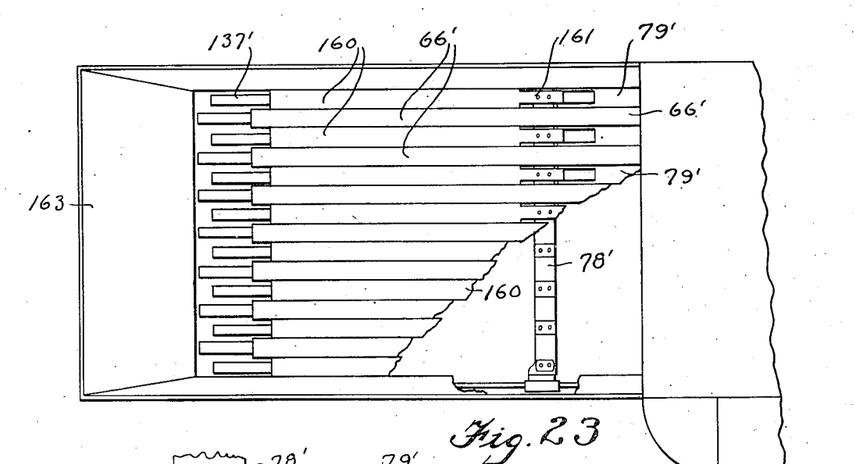
Fig. 23 is a top plan view showing the discharge table portion of the machine illustrated in Fig. 22.
Figure 24:
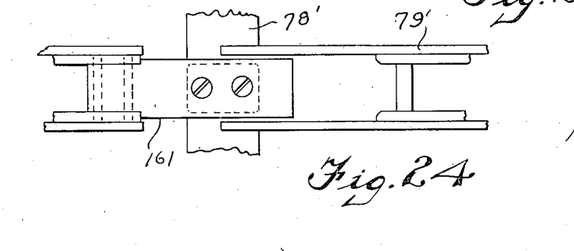
Fig. 24 is a detail view showing the telescopic connection between the ends of some of the conveyor bars shown in Fig. 23.

In the modification of the invention illustrated in Figs. 22, 23 and 24 the washing machine comprises a washing compartment 11', a rinse compartment 12' to which access is afforded through the slidable covers 62'. Supply pipe 18' extends to the nozzle pipes for the wash water, and pipe 48' extends to the nozzle pipes for the rinse water. Fill handles 21' and drain handles 28' respectively control the filling and draining of the rinse and wash water. A closure or door 43' provides access to the lower portion of the washing chamber while a similar door provides access to the lower portion of the rinse chamber. Front panels 26' are provided at the front of the wash chamber and rinse chamber. The conveying device and the hot rinse water supply are simultaneously started or stopped by control lever 85'. These various parts all correspond to the similarly arranged parts of the form of invention previously described, it being understood that the internal mechanism, drive means and the part of the conveying means which is inside the enclosed structure of the modification shown in Fig. 22 are the same as that already described.

In the form of construction illustrated in Fig. 22, however, the conveyor extends a considerable distance to the left of the discharge opening at the end of the rinsing chamber so as to provide a rather long exposed portion of the conveyor from which the dishes can be readily taken. This exposed portion of the conveyor, as illustrated in Fig. 23, comprises a series of longitudinally extending dish carrying bars 66' forming continuations of the bars of one of the movable frames of the conveyor. The bars 66' move up and down and also move in the direction of their length in the same manner as the bars 66. Between the various bars 66' there are bars 160, which move up and down at both ends, being carried at their rear ends by movable transversely extending beams 78'. The bars 160 are continuations of the bars 79' which alternate with the bars 66' and which move 180° out of phase with the bars 66'. The bars 160, however, do not move endwise as they are fixed to the bar 78' and the latter moves up and down but is not pulled in the direction of the bars since the forward ends of the bars 79' merely slide along the top of the beam 78', telescoping with the rear ends of the bars 160, as shown in Fig. 24. The dishes are thus transferred from the movable bars 66' to the movable bars 79' as the dishes move up to the bar 78'. However, when the dishes reach that point, their speed of movement is cut in half as the bars 160 merely move up and down and only the bars 66' are effective in propelling the dishes. The dishes therefore move comparatively slowly over the exposed portion of the conveyor to the end of the bars where the bars are provided with shoes 137', which carry the dishes down to the table portion 163.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a dishwashing machine of the character described, a washing chamber, and a plurality of elongated article supporting means arranged in predetermined spaced relationship and having apertures formed in the individual supporting means, the width of said apertures being greater than the spaces between adjacent supporting means, said supporting means extending substantially in the direction of article movement to propel the articles through the washing chamber, spray means arranged beneath said article supporting means for projecting washing fluid through said apertures, means for moving each of said supporting means upwardly and forwardly and downwardly and rearwardly in a predetermined orbit and means connecting certain of said supporting means for out of phase movement relative to certain others of said supporting means so that the dishes are successively and alternately engaged and propelled thereby.

2. In a washing machine of the character described, a washing chamber, means for propelling an article through said chamber comprising a plurality of elongated carrying members, means for moving each of said carrying members upwardly and forwardly and downwardly and rearwardly in a predetermined orbit, means connecting certain of said carrying members for out of phase movement relative to certain others of said carrying members so that the articles are successively and alternately engaged and propelled thereby, said article carrying members including laterally spaced side portions and article supports detachably received by said side portions and projecting above said side portions to form the article contacting portions of said carrying members, said article supports being apertured and of generally symmetrical form and adapted to be reversed end for end and to be turned upside down to equalize wear, and means for projecting washing fluid through said apertures to be effective upon the articles on said supports.

3. In a washing machine of the character described, a washing chamber, means for propelling an article through said chamber comprising a plurality of elongated carrying members, means for moving each of said carrying members upwardly and forwardly and downwardly and rearwardly in a predetermined orbit, means connecting certain of said carrying members for out of phase movement relative to certain others of said carrying members so that the articles are successively and alternately engaged and propelled thereby, said article carrying members including laterally spaced side portions and article supports detachably received by said side portions and projecting above said side portions to form the article contacting portions of said carrying members, said article supports comprising spaced longitudinally extending strips of non-metallic material and lateral tie rods positioned below the edges of said strips and extending between said strips and securing said strips together in pairs, and means for projecting washing fluid into the spaces formed by said strips and tie rods.

4. In a dishwashing machine of the character described, a washing chamber having an inlet and an outlet, means supplying washing fluid to said chamber, an article conveyor extending from the chamber inlet to the chamber outlet and having an extension arranged beyond the chamber outlet, said conveyor comprising a plurality of elongated carrying members, means for moving each of said carrying members upwardly and forwardly and downwardly and rearwardly in a predetermined orbit, means connecting certain of said carrying members for out of phase movement relative to certain others of said carrying members so that the articles are successively and alternately engaged and propelled through said chamber, the extension portion of the conveyor having means propelling the articels at a speed considerably less than the speed of movement through the chamber, said last named means including a plurality of elongated extension carrying members, means for moving certain of said extension carrying members upwardly and forwardly and downwardly and rearwardly, and means for moving others of said extension carrying members upwardly and downwardly.

5. In a dishwashing machine of the character described, a washing chamber including a tank for holding a quantity of washing liquid, means for distributing washing liquid from said tank into said chamber for the washing of articles therein, a second chamber adjacent the washing chamber, means distributing rinsing water in said second chamber, said chambers having a common passage through which articles are moved, propelling means reciprocably operable for propelling articles through the machine from the washing chamber to said second chamber, a container carried by said propelling means for reciprocating movement into the range of the rinsing sprays from said rinse water distributing means to receive rinse water therein, said container having an outlet passage movable therewith into a position to discharge liquid into said washing chamber, the rinse water supplied to said container being transferred to said washing chamber to maintain a desired liquid level therein.

6. In a dishwashing machine of the character described, a washing chamber and a plurality of article supporting means adapted to receive articles to be washed in any positioning thereon and spaced from each other to provide passages for fluid sprays, spray means in said chamber above and below said article supporting means, said lower spray means being adapted to project fluid through said passages onto the articles, actuating means for said supporting means including means providing an orbital movement of each of said supporting means in a predetermined path within said chamber, said actuating means also including means for moving a plurality of said supporting means out of phase with respect to each other so that the articles supported thereon are successively engaged and propelled by the supporting means in turn, to successively present the entire area of the supported articles to the projected fluid, said actuating means being substantially entirely positioned out of the effective area of said spray means to maintain said actuating means and the washing fluid out of contact with each other.

7. In a dishwashing machine of the character described, a washing chamber, a plurality of supporting means upon which the articles to be washed are directly placed in any positioning thereon, said supporting means being arranged in predetermined spaced relationship to provide a plurality of apertures for the passage of washing fluid, said apertures being distributed throughout the surface formed by said supporting means, means for imparting a longitudinal reciprocatory motion to a predetermined group of said supporting means to periodically propel the articles supported thereon forward in said washing chamber, means including another group of said supporting means for intermittently supporting the articles out of contact with said first named group of supporting means to provide for return movement of said first named group when out of contact with said articles, and a plurality of spray means located beneath said supporting means and having a spacing corresponding to that of the apertures for directing sprays of washing fluid toward and in substantial alignment with said apertures to provide substantially continuous washing action of said articles independently of their positioning and independently of which group of supporting means is supporting the articles.

8. In a dishwashing machine of the character described, a washing chamber, a plurality of carrying members upon which the articles to be washed are directly placed, said members having apertures therein for the passage of washing sprays, means for imparting a longitudinal reciprocatory motion to a predetermined group of said members to periodically propel the articles supported thereon forward in said washing chamber, means including another group of said members for intermittently supporting the articles out of contact with said first named group of members to provide for return movement of said first named group when out of contact with said articles, and spray means having a spacing corresponding to the spacing of said apertures and providing for directing sprays of washing fluid into and through said carrying member apertures, said carrying member apertures having a longitudinal extent commensurate with the stroke of said carrying members to provide uninterrupted passage of said washing fluid through said carrying member apertures at all positions of said carrying members.

9. A dishwashing machine of the character described which comprises a washing chamber, a plurality of groups of article supporting members within said chamber having substantially plane upper surfaces adapted to directly receive said articles in any positioning thereon, said supporting members being spaced to provide longitudinally extending apertures for the passage of fluid projected from spray means, the members of one group interfitting with those of another, the spacing between adjacent members of the same group being less than the smallest supporting area of the individual dishes received thereon so that the members of any one group will properly support the dishes when positioned at random thereon, means for actuating the members of said groups cyclically with a forward and upward movement of limited travel with respect to the longitudinal extent of said chamber to receive and propel forward the articles resting upon the members of another said group, the members of each group returning with a periodic movement so that any point on the member traverses only a limited portion of the washing chamber and of the receiving and discharging stations to maintain all parts of the members substantially within a zone of predetermined temperature and avoid cooling and reheating of said members with attendant heat loss, the articles at any positioning upon said conveying means being transferred from one group of members to another to be thereby advanced through said washing chamber with a substantially continuous direction of travel, said transfer occurring a number of times during passage through said washing chamber to provide changing areas of support for each said article on said members, power drive means for said actuating means, and spray means including means located below said conveying means in coordinated spaced relation therewith for directing washing fluid upwardly into and through said apertures and upon said articles to be effective upon the entire surface of said articles as the area of their support changes.

10. A dishwashing machine of the character described which comprises a washing chamber, spray means within said chamber, conveyor means for receiving articles of varying size and shape directly thereon at a receiving station at one end of said washing chamber, for transporting such articles through said chamber for purposes of being washed under the action of said spray means, and for discharging said articles at a discharge station at the opposite end of said chamber, said conveyor means including a plurality of groups of article supporting members having substantially plane upper surfaces adapted to directly receive said articles in any positioning thereon, the members of one group interfitting with those of another, means for actuating the members of said groups cyclically with a forward and upward movement of limited travel with respect to the longitudinal extent of said chamber to receive and propel forward the articles resting upon the members of another said group, the members of each group returning with a periodic movement so that each member traverses only a limited portion of the washing chamber and of the receiving and discharging stations, the articles at any positioning upon said conveying means being transferred from one group of members to another to be thereby advanced through said washing chamber with a substantially continuous direction of travel, said transfer occurring a number of times during passage through said washing chamber to provide changing areas of support for each said article on said members, and power drive means for said actuating means, said actuating means being substantially entirely positioned out of the effective zone of said spray means to maintain said actuating means and the washing fluid out of contact with each other.

11. A dishwashing machine of the character described adapted for the washing of fragile articles such as dishes, glassware and the like comprising a washing chamber, a plurality of groups of interfitting article supporting members forming a conveyor surface adapted to receive the articles directly thereon in random positioning, said article supporting members having longitudinally extending apertures therethrough to provide for the upward passage of fluid washing sprays from below, means for operating the members of each group with an elongated horizontal movement, means for operating the members of each group with a short vertical movement, means for coordinating the movements and for driving the members of one group in predetermined correlated phase relation to those of the other group such that during short intervals all of said members occupy the same horizontal plane and are moving forwardly at substantially the same rate to thereby provide for smooth transfer of the articles from one group to another, and means for projecting a plurality of separate sprays of washing fluid upwardly into and through said apertures and into washing relation with the articles upon said members to effectively wash the entire lower surface thereof as the area of support of the articles changes upon transfer from one of said groups of members to another.

12. A dishwashing machine of the character described adapted for the washing of fragile articles such as dishes, glassware, and the like comprising a washing chamber, a plurality of groups of interfitting article supporting members forming a conveyor surface adapted to receive the articles directly thereon in random positioning, said article supporting members having longitudinally extending apertures therethrough to provide for the upward passage of fluid washing sprays from below, the adjacent members of any one group being spaced from each other a limited distance not greater than the dimension of the supporting area of the articles received thereon so that said articles will be properly supported in any position on any one group of said members, means for operating the members of each group with an elongated horizontal movement, means for operating the members of each group with a short vertical movement, means for coordinating the movements and for driving the members of one group in predetermined correlated phase relation to those of the other group such that during short intervals all of said members occupy the same horizontal plane and are moving forwardly at substantially the same rate to thereby provide for smooth transfer of the articles from one group to another, the elevation of said horizontal plane being substantially that occupied by the supporting members in their uppermost position, said drive means providing for the rapid dropping away and accelerated return movement of the group of members not supporting the articles, and means for projecting a plurality of separate sprays of washing fluid upwardly into and through said apertures and into washing relation with the articles upon said members to effectively wash the entire lower surface thereof as the area of support of the articles changes upon transfer from one of said groups of members to another.

13. A dishwashing machine of the character described which comprises a washing chamber, two groups of interfitting article supporting means for receiving articles of varying size and shape directly thereon at a receiving station at one end of said washing chamber and for transmitting such articles through said chamber, said article supporting means having apertures therethrough for the passage of fluid washing sprays, means for moving one of said groups of supporting means forwardly and rearwardly, means for moving said group upwardly and downardly with the upward and downward travel being of small extent as compared with the forward and rearward travel, means coordinating said forward and rearward travel and said upward and downward travel to provide upward travel during the last of said rearward travel and the first of said forward travel, and downward travel during the last of said forward travel and the first of said rearward travel, means for moving the other group of supporting means similarly to said first named group, means for coordinating the operation of said groups of supporting means to effect operation thereof in predetermined phase relation such that the articles are transferred from one group to the other group when both said groups are moving forwardly, said transfer taking place at an elevation substantially in the plane occupied by said supporting means in their uppermost position, to provide a substantially continuous forward motion of said articles, the width of each of the supporting means and the spacing between adjacent supporting means of the same group being less than the smallest supporting area of the individual dishes received thereon so that the members of any one group will properly support the dishes when positioned at random thereon, and spray means located above and below said article supporting means, the spray means below said supporting means being arranged in predetermined relation with respect to said apertures to direct sprays of washing fluid into and through the apertures of both said groups of supporting means for effectively washing the entire lower surface of the articles as they move through the washing chamber.

14. A dishwashing machine of the character described which comprises a washing chamber, spray means within said washing chamber, a handling station adjacent each end of said washing chamber at which the articles are received and discharged, conveyor means for receiving articles of varying size and shape directly thereon at one of said handling stations, for transporting such articles through said washing chamber for purposes of being washed under the action of said spray means, and for discharging such articles at the other of said handling stations, said conveyor means including a plurality of groups of article supporting members, actuating means for said supporting members including means providing an orbital movement of each of said groups of said supporting members, said actuating means also including means for moving a plurality of said groups out of phase with respect to each other so that the articles supported thereon are successively engaged and propelled by the groups in turn, said actuating means being located beneath one of said handling stations beyond the lateral confines of said washing chamber to maintain said actuating means and the washing fluid out of contact with each other, pump means located beneath said washing chamber for supplying washing fluid to said spray means, means preventing access of said washing fluid upon said pump means, and driving connections between said pump means and said actuating means.

DAVID A. MEEKER.
HERBERT L. JOHNSTON.